United States Patent [19]

Torii et al.

[11] Patent Number: 5,292,224
[45] Date of Patent: Mar. 8, 1994

[54] APPARATUS FOR HOLDING STACKED WORKPIECES AND FEEDING THE SAME

[75] Inventors: Nobutoshi Torii, Hachioji; Shigemi Inagaki, Gotenba; Ryo Nihei; Mitsuhiro Yasumura, both of Yamanashi, all of Japan

[73] Assignee: Fanuc Ltd., Minamitsuru, Japan

[21] Appl. No.: 820,674

[22] PCT Filed: May 27, 1991

[86] PCT No.: PCT/JP91/00704
§ 371 Date: Jan. 28, 1992
§ 102(e) Date: Jan. 28, 1992

[87] PCT Pub. No.: WO91/18812
PCT Pub. Date: Dec. 12, 1991

[30] Foreign Application Priority Data

May 30, 1990 [JP] Japan .................. 2-138574
May 30, 1990 [JP] Japan .................. 2-138575

[51] Int. Cl.⁵ ................. B65G 59/02; B65G 61/00
[52] U.S. Cl. ................. 414/796.4; 414/795.7; 414/796.7; 414/900; 901/45; 211/59.3
[58] Field of Search ............. 414/416, 788.9, 745.7, 414/900, 911, 923; 211/49.1, 59.3; 108/135; 901/45

[56] References Cited

U.S. PATENT DOCUMENTS

| 4,019,452 | 4/1977 | Rouse | 414/788.9 |
| 4,195,961 | 4/1980 | Waiblinger | 414/796.9 |
| 4,354,605 | 10/1982 | Brutsman | 211/59.3 |
| 4,958,697 | 5/1976 | Brown et al. | 211/59.3 |
| 5,169,271 | 12/1992 | Yamashita | 414/911 |

FOREIGN PATENT DOCUMENTS

| 2758357 | 3/1979 | Fed. Rep. of Germany | 414/795.7 |
| 250829 | 10/1987 | German Democratic Rep. | 414/923 |
| 55-28667 | 7/1980 | Japan . | |
| 56-55146 | 12/1981 | Japan . | |
| 57-10011 | 2/1982 | Japan . | |
| 59-21688 | 5/1984 | Japan . | |
| 63-27155 | 6/1988 | Japan . | |
| 321651 | 12/1989 | Japan | 414/416 |
| 2-17798 | 5/1990 | Japan . | |
| 1335412 | 9/1987 | U.S.S.R. | 414/923 |
| 1371859 | 2/1988 | U.S.S.R. . | |
| 877099 | 9/1961 | United Kingdom | 414/416 |

*Primary Examiner*—Michael S. Huppert
*Assistant Examiner*—Gregory A. Morse
*Attorney, Agent, or Firm*—Armstrong, Westerman, Hattori, McLeland & Naughton

[57] ABSTRACT

An apparatus for holding a plurality of workpieces (W) in a stack on a pallet (22), supporting the workpieces (W) in place on the pallet (22) by a plurality of workpiece support rods (26), and transporting and transferring the uppermost workpiece by a workpiece gripping hand (50) provided with gripping fingers (54) to a desired position, is provided with elastic lifting springs (32) for continuously biasing the workpiece support rods (26) upward to support the workpieces (W) stably in place by the upright work support rods (26). The workpiece gripping hand (50) grips the uppermost workpiece (W) with the gripping fingers (54) without interference, after depressing the workpiece support rods (26) with a depressing plate (56) provided on the back side of the gripping fingers (54) so that the uppermost workpiece (W) is exposed above the upper ends of the workpiece support rods (26), and then transports the workpiece (W) to a desired position. When placing the workpiece (W) on the pallet (22) by the work gripping hand (50), the gripping fingers (54) release the workpiece (W) after the workpiece support rods (26) are depressed with the depressing plate (56).

10 Claims, 5 Drawing Sheets

APPARATUS FOR HOLDING STACKED WORKPIECES AND FEEDING THE SAME

TECHNICAL FIELD

The present invention relates to a workpiece transfer apparatus and, more particularly, to an apparatus for holding stacked workpieces and feeding the same, capable of holding a plurality of workpieces (hereinafter referred to simply as "work") to be processed, and being provided with work feed units each having a pallet and work support rods, for holding work in a stack, and transporting means having a work gripping hand unit capable of gripping and taking up the work held on the work feed unit one at a time, transporting the work to a destined or predetermined position such as a chucking device mounted on a spindle of an automatic machine tool, for example, an automatic lathe, removing the machined work from the chucking device of the spindle to transport the machined work to the work feed unit having an empty pallet, and stacking the machined work in a stack on the pallet.

BACKGROUND ART

The automation of a work machining system, i.e., that known as FA (factory automation), has been widely disseminated. The automated work machining system grips a work to be machined, with a gripping device attached to the extremity of the robot hand i.e., an end effector, of an industrial robot, transports the work, feeds the work to an automatic machine tool, such as an automatic lathe or a machining center, and grips the machined work with the gripping device to transport the processed work. Generally, a workshop of an FA system has a work feed station provided with work feed means for feeding work successively to the robot hand of an industrial robot and for receiving the machined work from the robot hand to efficiently handle and process many pieces of work. In most cases, such a work feed means is called a work feeder. The work feeder comprises an intermittently turning base or a circulating device, and a plurality of pallets mounted on the intermittently turning base or the circulating device. The pallets each holding a plurality of work in a stack are located sequentially at a work transfer position. The industrial robot picks up one of the stacked work from the work feeder at the work transfer position, attaches the work to the spindle of an automatic machine tool, i.e., the chuck of the automatic machining tool, and returns the machined work to the empty pallet of the work feeder. The work feeder is replenished with fresh work, and delivers machined work therefrom in accordance with a progress of an automatic machining process.

FIG. 10, 11 and 12 are schematic views of the layout of a conventional industrial robot and a conventional work feeder, and the construction of a pallet and work support rods of the conventional work feeder.

Referring to FIGS. 10, 11 and 12, the industrial robot 1, of the prior art, has a robot body 2, a first robot arm 3 extending from the robot body 2, and a second robot arm 4 pivotally joined to the first robot arm 3. A robot hand 5, i.e., an end effector, is attached to the extremity of the second robot hand 4, and two work grippers 6 are held on the robot hand 5. The first robot arm 3 is capable of both turning and extended. The first robot arm 3 and the second robot arm 4 can be turned together in directions indicated by an arrow P. A work feeder 8 has a base 9, and a plurality of pallets 10 mounted on the base 9. As shown in FIG. 11, each pallet 10 has a work support plate 11 and is provided with a plurality of work support rods 12 for holding work in place on the work support plate 11. The pallets 10 are moved on the base 9 via a work lifter 13 disposed near a predetermined work transfer station.

A plurality of work is held in a stack on each pallet 10 of the work feeder 8 combined with the industrial robot 1, and the pallets 10 are moved sequentially via the work transfer station near the work lifter 13. When the pallet 10 is located at the work transfer station, the work gripper 6 of the robot 1 approaches the work, and grips and lifts up the same. Then, the work gripper 6 is moved away from the work feeder 8 by a motion indicated by the arrow P, and the work is fed to the machining stage of an automatic machining tool such as the spindle of an automatic lathe, not shown, by the turning and linear motions of the first robot arm 3. On the other hand, when the work feeder 8 receives a machined work from the automatic lathe, the machined work is moved away from the spindle of the automatic lathe by the turning and linear motions of the first robot arm 3, and the work gripper 6 approaches the work feeder 8 to return the machined work to an empty one of the pallets 10 of the work feeder 8.

A series of the foregoing operations is carried out according to a predetermined program.

It is understood from considering the actions of the conventional work feeder 8 and the industrial robot 1 that the work lifter 13 of the work feeder 8 functions in gripping the uppermost work among work stacked on the pallet 10 with the work gripper 6 held on the robot hand 5 of the industrial robot 1, to insert a lifting fork accommodated in the work lifter 13 to a space under the work support plate 11, and to lift up the work support plate 11 to place the work on a level corresponding to the upper ends of the work support rods 12 so that the work gripper 6 held on the robot hand 5 is able to easily grip the work. Such an operation of the work lifter 13 is needed because the work support rods 12 are set upright, the length of portions of the work support rods 12 extending upward from the work support surface 11 of the work support plate 11 is fixed, although the work support rods 12 have mounting studs 12a slidably seated on the inner bottom surface of the pallet 10 so that the work support rods 12 are radially movable along cross-shape slots (FIG. 11) formed in the work support plate 10a, depending on the size of works as shown in FIG. 12, the work rods 12 interfere with the movement of the robot hand 5 if the work gripper 6 held on the robot hand 5 is moved toward the uppermost work only by the longitudinal movement of the first robot arm 3, and thus the work gripper 6 is unable to reach the uppermost work.

The use of such a work lifter in the automated machining workshop and timing the operation of the work lifter 13 in synchronism with the work transfer operation of the industrial robot 1 requires a complicated programmed operation for carrying out the automatic machining, and the work can be transferred between the robot 1 and only the pallet 8 located at a position in alignment with the work lifter 13, because the work lifter is essential to the transfer of the work between the industrial robot 1 and the pallet 10. Furthermore, since the disposition of the work lifter 13 is limited when installing the work feeder 8 in the automated machining workshop, there are many restrictions on the disposition of the work feeder 8 relative to the automatic machining tool and the industrial robot.

DISCLOSURE OF THE INVENTION

Accordingly, a principal object of the present invention is to solve the foregoing problems.

Another object of the present invention is to provide an apparatus for holding work in a stack and feeding the same, taking into consideration that most transporting means provided with a work gripping hand, such as a robot hand has an operating function of advancing a work gripper toward a work feeder, capable of taking out the uppermost work among the work stacked on the pallet of the work feeder by utilizing the operating function of the transporting means provided with the work gripping hand.

A further object of the present invention is to provide an apparatus for holding work in a stack and feeding the same, and capable of enabling the transfer of a work between transporting means provided with a work gripper and capable of approaching a work feeder, and at least one pallet of the work feeder.

A further object of the present invention is to provide an apparatus for holding work in a stack and feeding the same, and capable of enabling the transfer of a work between transporting means provided with a work gripper and capable of approaching a work feeder, and at least one pallet of the work feeder.

A still further object of the present invention is to provide an apparatus for holding work in a stack and feeding the same, employing work support rods extending upward from the upper surface of the pallet of a work feeder to support stacked work in place, and capable of moving vertically downward and of being returned from a lower position to the upper normal position by the resilience of elastic means, and facilitating the transfer of the uppermost work among the stacked work from the pallet to transporting means provided with a work gripper.

In view of the foregoing objects of the invention, work support rods extending upward from a work support surface of a pallet of a work feeder are constructed to be depressed longitudinally against a resilient lifting force, a means is provided on a work gripping hand to depress the work support rods as the work gripping hand having work gripping members, such as chucking fingers, approaches work stacked on the pallet and exposes the uppermost work at a position permitting the work gripping hand to grip the uppermost work, and the plurality of work support rods of the pallet are depressed by the depressing means when placing the work held by the work gripping hand on the pallet so that the work can be transferred from the work gripping hand to the pallet without interference between the work support rods and the work gripping hand.

In accordance with the present invention there is provided an apparatus for holding work in a stack and feeding the same, including a work feed means for holding a plurality of work in a stack and sequentially feeding the same, and a work transporting means having a work gripping hand for gripping an uppermost work among the work held in a stack on the work feed means, the work transporting means transporting a work gripped by the work gripping hand and transferring the same to a desired position, characterized in that said work feed means comprises a pallet, a plurality of upright work support rods arranged at intervals in a circle, to stably support in place said plurality of work stacked on a work support surface of said pallet, a means for disposing said plurality of work support rods to be depressed below said work support surface of said pallet, and a means for constantly and resiliently lifting said plurality of work support rods upward to permit said plurality of work support rods to be extended upward from said work support surface of said pallet, and that said work gripping hand of said work transporting means is provided with a plurality of gripping fingers for releasably gripping a work, and a depressing means disposed on a back side of said gripping fingers to simultaneously depress said plurality of work support rods of said work feed means, whereby said gripping fingers are brought to a position suitable for gripping said uppermost work as said work gripping hand is moved downward toward said uppermost work.

BEST MODE OF CARRYING OUT THE INVENTION

Figure 1:
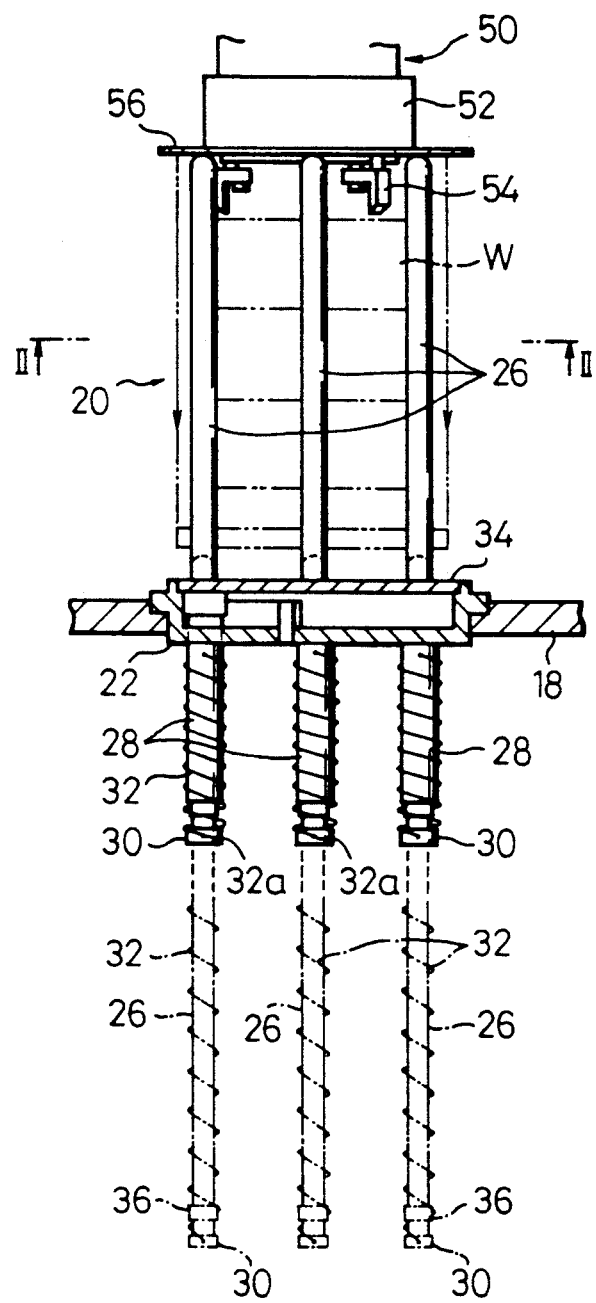
FIG. 1 is a front view illustrating a general construction and functions of an apparatus for holding work in a stack and feeding the same, according to a first embodiment of the present invention.
Figure 2:
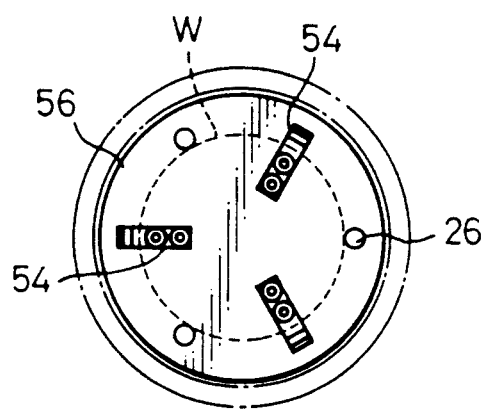
FIG. 2 is a bottom view taken along the line II-II in FIG. 1, and illustrating an arrangement of gripping fingers and a depressing plate accommodated in a work gripping hand.

Referring to FIGS. 1 and 2, and apparatus for holding work in a stack and feeding the same, embodying the present invention, has a work feed device 20 capable of holding a plurality of work W in a stack and of feeding the same, and a work gripping hand 50 for transferring the work W in cooperation with the work feed device 20. The work feed device 20 has a pallet 22 fastened to a base plate 18, such as a rotary table, with screws or the like. A later-described adjusting plate is mounted for rotation in a horizontal plane on the pallet 22. A plurality of work support rods 26 are set upright on the adjustable plate to secure work W of the same size in place on the pallet 22 in a stack. Each work support rod 26 extends downward through a cylindrical bushing 28 provided with a flange, and through the pallet 22. A spring holding ring 30 is attached to the lower end of the work support rod 26. A lifting spring 32 has one end 32a held by the spring holding ring 30, and the other end 32b fastened to the side surface of the cylindrical bushing 28 under the lower surface of the pallet 22. The work support rods 26 are continuously urged upward by an upward force of the lifting springs 32, respectively. Note, the work, support rod 26 can be moved downward through the cylindrical bushing 28 by a downward force against the upward force of the lifting spring 32. Also shown in FIG. 1 by broken lines are the work support rods 26 moved downward by extending the lifting springs 32.

The work gripping hand 50 is attached to the extremity of transporting means, not shown in FIG. 1, and is provided with a plurality of work gripping members (three gripping members in the embodiment as shown in FIG. 2), i.e., gripping fingers 54, and a gripping finger driving device 52 of a known mechanism for simultaneously moving the gripping fingers 54 radially inward for a gripping operation, and for simultaneously moving the gripping fingers 54 radially outward for a release operation. The work gripping hand 50 is also provided with an annular depressing plate 56 disposed to surround the gripping fingers 54. When the work gripping hand 50 is moved toward the upper end of the work feed device 20, the depressing plate 56 comes into contact with the upper ends of the work support rods 26 to push the work support rods 26 downward, so that the work support rods 26 are gradually moved downward. When the work support rods 26 are arranged at intervals in a circle to support circular work W, the outside diameter of the depressing plate 56 is greater than the diameter of the circle, and the inside diameter of the same is smaller than the diameter of the circle. If the work support rods 26 are radially movable toward and away from the center of the pallet 22 depending on the diameter of the work W, the depressing plate may be a disk.

Figure 3:
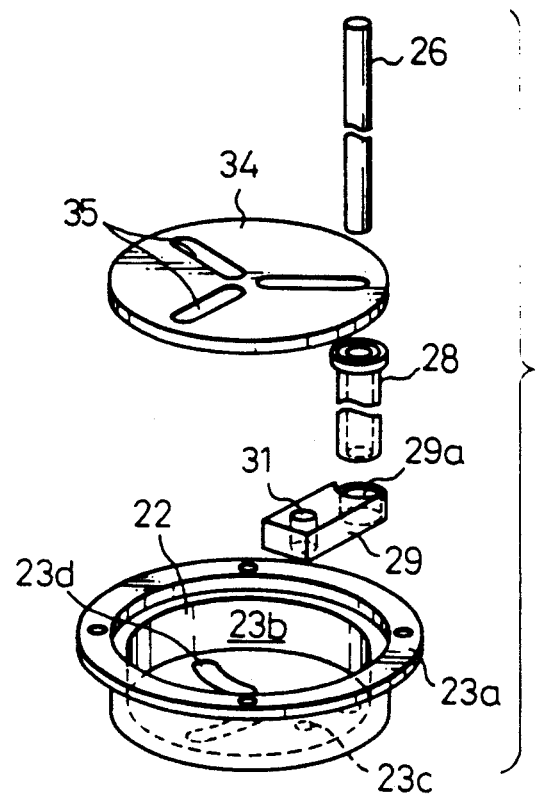
FIG. 3 is an exploded perspective view showing a construction of a work feed device accommodated in the apparatus for holding work in a stack and feeding the same, and provided with a pallet and vertically movable work support rods.
Figure 4:
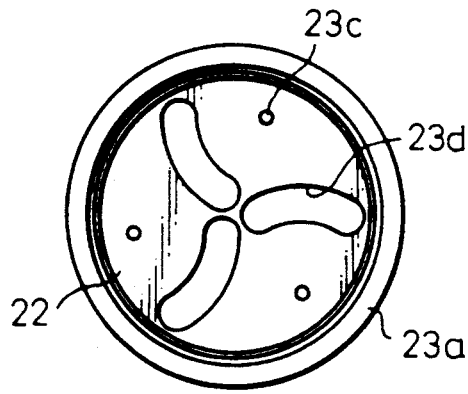
FIG. 4 is a plan view of the bottom face of the pallet of the work feed device.
Figure 5:
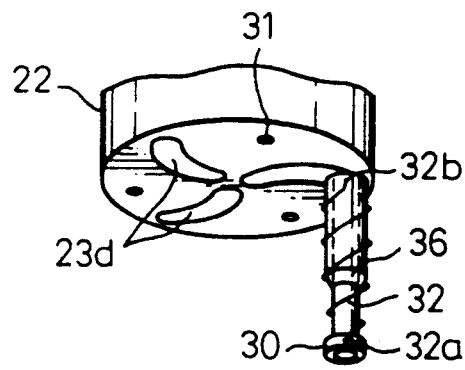
FIG. 5 is a perspective view of the pallet as viewed from the side of the bottom surface thereof.

Referring to FIGS. 3 through 5, which are exploded views illustrating a detailed construction of the work feed device 20 of FIG. 1, the pallet 22 has the shape of a deep dish and has a flange 23a to be fastened to the base plate 18, such as a rotary table, and a cylindrical portion 23b defining a space. Shoes 29 provided with pivots 31, respectively, are placed in the space of the cylindrical portion 23b with the pivots 31 fitted in through holes 23c (FIG. 4) formed in the bottom wall of the cylindrical portion 23b, to turn on the pivots 31 along the bottom wall of the cylindrical portion 23b. The cylindrical bushing 28 is fitted in a through-hole 29a formed in the free end of the shoe 29, to extend downward from the pallet 22 through a curved slot 23d having the shape of a circular arc formed in the bottom wall of the cylindrical portion 23b. The work support rod 26 is extended through the bushing 28. The work support rods 26 are extended upward through straight slots 35 formed in the adjusting plate 34 fitted in the upper portion of the pallet 22 having the shape of a deep dish. The straight slots 35 are arranged at the same angular intervals as those at which the curved slots 23d are arranged. Since the adjusting plate 34 is provided with the straight slots 35 and the bottom wall of the pallet 22 is provided with the curved slots 23d respectively corresponding to the straight slots 35, the plurality of work support rods 26 (three work support rods, in this embodiment) are simultaneously moved radially inward or outward when the adjusting plate 34 is turned relative to the pallet 22 to adjust the diameter of the circle on which the work support rods 26 are arranged according to the outside diameter of the work W to be supported by the work support rods 26.

Referring to FIG. 5, it is clearly shown that the bushing 28 projects downward from the lower surface of the bottom wall of the pallet 22, the work support rod 26 extends downward through the bushing 28, and the lifting spring 32 is provided with one end 32a fastened to the outer surface of the bushing 28. As stated above, the lifting spring 32 urges the work support rod 26 upward, to restore the work support rod 26 toward its normal upper position from the depressed position thereof, and to prevent the work support rod 26 from falling off the pallet 22. It is possible to adjust the position of the upper end of the work support rod 26 according to the maximum height of the stack of the work W, by adjusting the distance between the spring holding ring 30 and the lower end of the bushing 28 with an adjusting collar 36 fastened to the work support rod 26 with screws at a desired position. Although only one of the plurality of work support rods 26, and the parts associated with the same work support rod 26 are shown in FIGS. 3 and 5, the plurality of work support rods 26 are of course provided with the same parts associated therewith.

Figure 6:
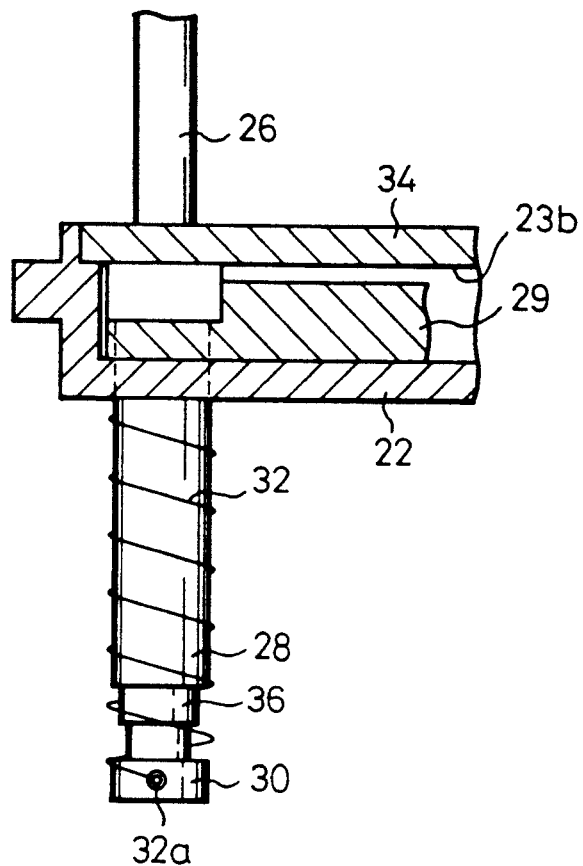
FIG. 6 is a fragmentary sectional view illustrating a construction of an assembly of the pallet and the work support rods in detail.

As best shown in FIG. 6, the bushing 28 is fitted in the shoe 29 placed inside a cylindrical chamber 23b of the pallet 22.

Figure 7:
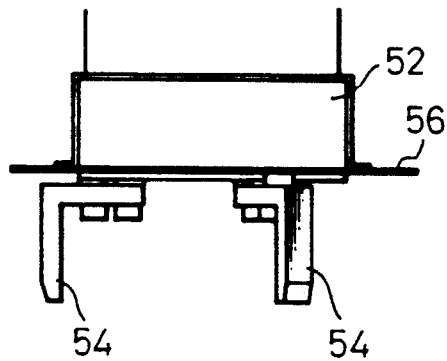
FIG. 7 is a front view of the work gripping hand.

FIGS. 2 and 7 make it possible to clearly understand the construction of the work gripping hand 50. It will be understood that the depressing plate 56 arranged to depress the work support rods 26, to thereby expose the uppermost work among the stacked work, is made of a single annular plate disposed on the back side of the gripping fingers 54. A gripping finger driving device 52 per se has a known mechanism, and therefore, only the casing thereof is shown in FIG. 7 and an illustration of the internal mechanism thereof is omitted.

An embodiment of the present invention will be described hereinafter, wherein an apparatus for holding work in a stack and feeding the same in accordance with the present invention is applied to both a work feeder and a work transporting arm of an industrial robot having a work gripping hand to thereby carry out an automatic transfer of a work to and a removal of the work from an automatic machining tool or an automatic lathe.

Figure 8:
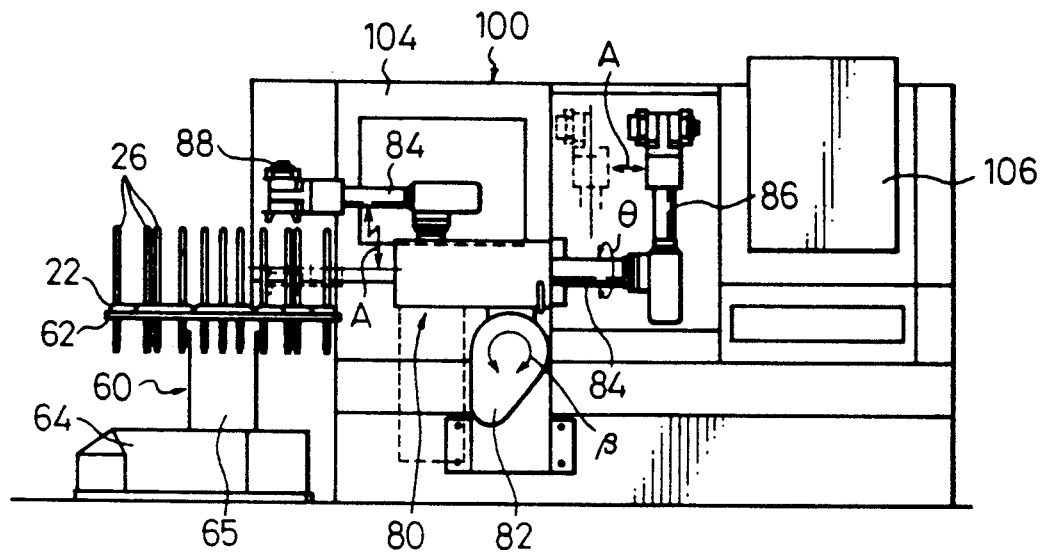
FIG. 8 is a front view of an automatic lathe, i.e., a most preferred embodiment of the present invention, provided with a work feed unit of an apparatus for holding work in a stack and feeding the same of the present invention as a work feeder, and a transporting means having a work gripping hand as an industrial robot attached to the side surface of the automatic lathe.
Figure 9:
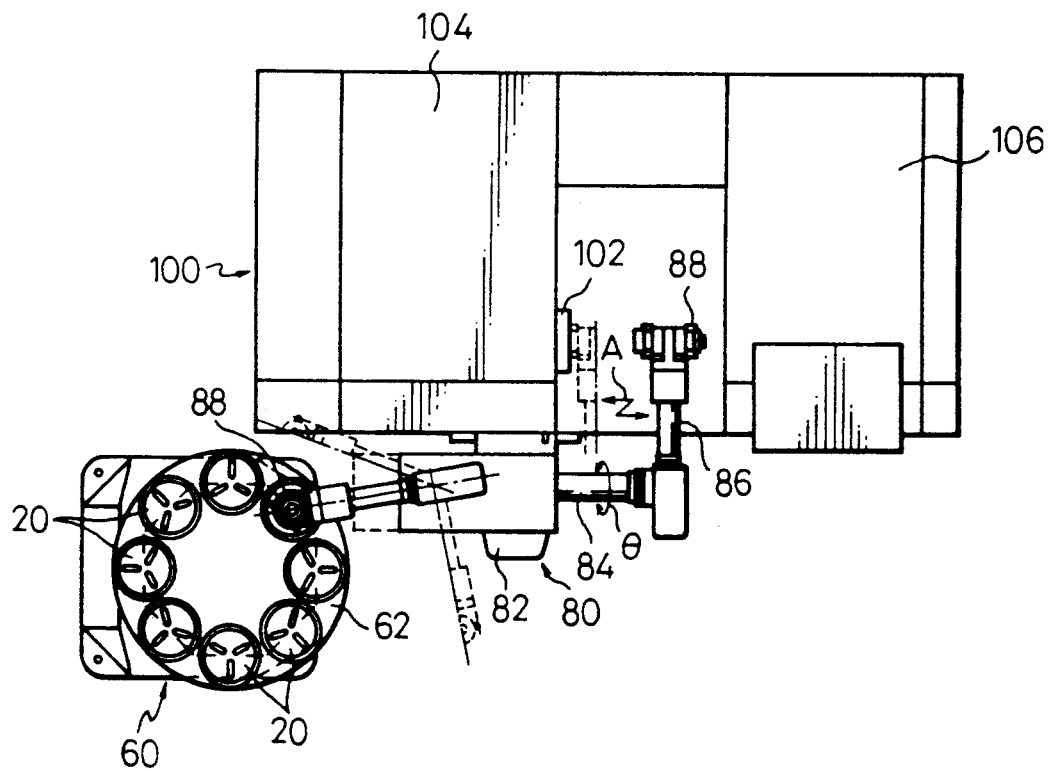
FIG. 9 is a top plan view of the automatic lathe of FIG. 8.
Figure 10:
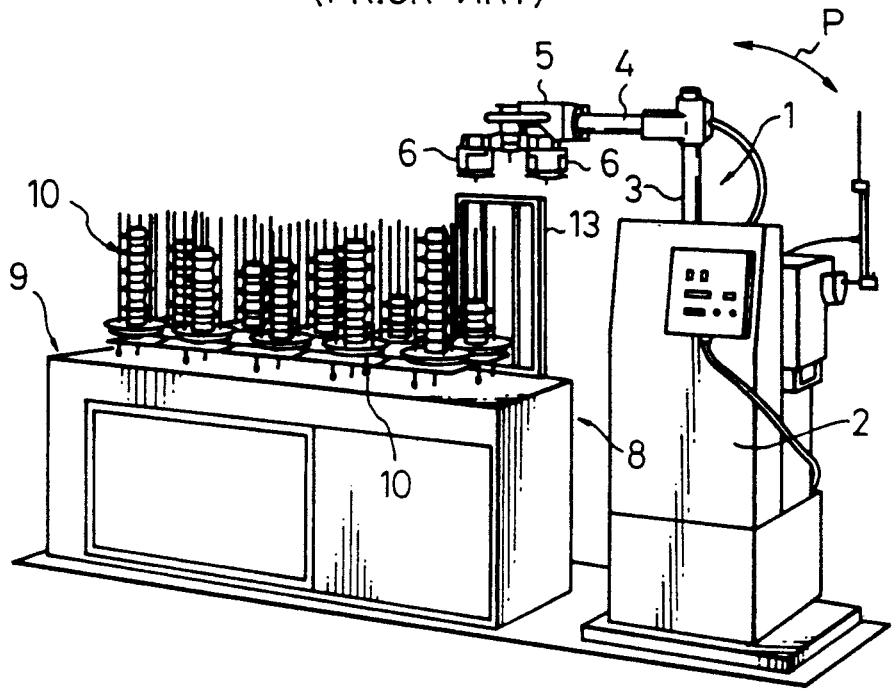
FIG. 10 is a front view of an automatic lathe provided with a conventional apparatus for holding work in a stack and feeding the same.
Figure 11:
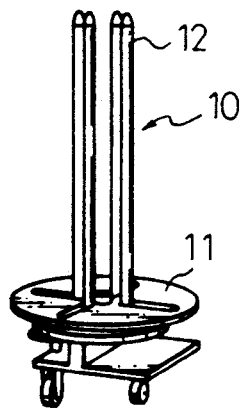
FIG. 11 is a perspective view illustrating the construction of the work feed unit of the apparatus for holding work in a stack and feeding the same, of FIG. 10.
Figure 12:
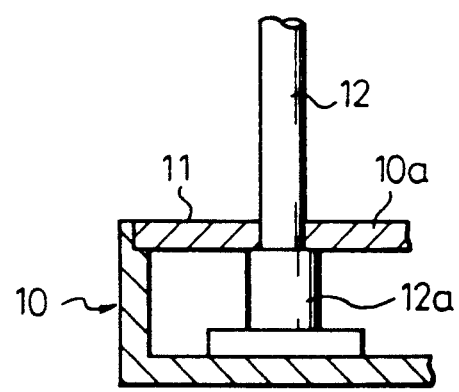
FIG. 12 is a fragmentary sectional view showing the construction of a conventional work support rod.

Referring to FIGS. 8 and 9, a work feeder 60 has a rotary table 62 fixedly supporting the plurality of work feed devices 20 thereon, and a driving unit 64 accommodating an intermittent driving mechanism therein and an output shaft 65 joined to the rotary table 62 to intermittently turn the rotary table 62. Each work feed device 20 is provided with the pallet 22 having the work support rods 26 capable of being depressed. Each work feed device 20 can hold a plurality of work in a stack.

An automatic lathe 100 having a known construction therein is provided with a spindle 102 having a chucking device to chuck a work to be machined, a spindle drive unit 104, and a control unit 106. The automatic lathe 100 carries out a machining operation thereof within an enclosed chamber, to prevent a scattering of cutting liquid. A industrial robot 80 is installed beside the side surface of the automatic lathe. The industrial robot 80 (hereinafter referred to simply as "robot") is provided with a robot body 82, a first robot arm 84, a second robot arm 86, and robot hands 88 attached to the extremity of the second robot arm 86. The robot hands 88 includes two sets of the work gripping hands 50 attached to the extremity of the second robot arm 86 in a duplex head arrangement. The industrial robot is of a known construction having a multiple-degree-of-freedom of motion; the first robot arm 84 is able to turn is directions indicated by an arrow $\theta$, and to linearly move in directions indicated by an arrow A, and the first and second robot arm 84 and 86 can be turned as a unit in directions indicated by an arrow $\beta$. The robot hand 88 has the same construction as the work gripping hand 50, and accordingly, has a novel construction such that the depressing plate 56 is provided on the back side of the work gripping members.

Since the industrial robot 80 has a multiple-degree-of-freedom of motion, the robot hand 88 attached to the extremity of the second robot arm 86 can be positioned in front of the spindle 102 of the automatic lathe 100 by turning motions thereof. Moreover, the work gripped by the robot hand 88 can be attached to the spindle 102, and the work attached to the spindle 102 can be removed therefrom, by using a linear telescopic motion of the first robot arm 84. The robot hand 88 can be also positioned above the work feeder 60, by the turning motions thereof, and moved to the work W held in a stack on the pallet 22 of the work feed device 20 by the linear telescopic motion of the first robot arm 84. When the robot hand 88 is lowered toward the upper ends of the work support rods 26 extending upright from the pallet 22, by robot motions, the depressing plate 56 of the robot hand 88 depresses the work support rods 26 so that the gripping fingers 54 provided under the depressing plate 56 are able to directly reach the uppermost work to thereby firmly grip the same. Thus, the apparatus for holding work in a stack and feeding the same in accordance with the present invention is able to lower the work support rods 26 supporting a plurality of stacked work by moving the hand unit toward the work stacked on the pallet 22 without using an auxiliary means, until the uppermost work is exposed to be easily accessible, and thus the disadvantage that the gripping fingers 54 are unable to grip the work due to the interference of the work support rods 26 with the movement of the hand unit or the robot hand 88 does not occur.

In accordance with the present invention, when the work gripping hand 50 is employed for constructing the robot hand 88, the work can be transferred between the robot hand 88 and the plurality of work feed devices 20 as well as between the robot hand 88 and one of the plurality of work feed devices 20, because the second robot arm 86 can be turned through a large angle above the work feeder 60 as indicated by dotted line in FIG. 9. Accordingly, the apparatus in accordance with the present invention is capable of readily carrying out both an operation for sequentially taking up the stacked work from one of the work feed devices 20 with one of the robot hands 88 of the duplex head hand unit and an operation for depressing the work support rods 26 of an empty work feed device 20 and for transferring a machined work removed from the automatic lathe with the other robot hand 88 to the pallet 22 of the empty work feed device 20 to stack the machined work on the pallet 22.

As apparent from the foregoing description, the present invention provides an apparatus for holding work in a stack and feeding the same, capable of an automatic work transfer, of transporting a work to a predetermined position, of transferring a work among stacked work without requiring the control and operation of an auxiliary device such as a work lifter, which is essential to the prior art, and of overcoming a disadvantage of the prior art that a work can be transferred only at a work transfer station near the work lifter. Particularly, the work gripping unit as applied to the robot hand, i.e., the end effector, of an industrial robot enables an efficient automatic work transfer operation for transporting a work from a work feeder to an automatic processing machine and for returning a processed work from the automatic processing machine to the work feeder. Furthermore, the present invention enables the omission of the work lifter and the prevention of interference between the work feeder and the work gripping unit, by using a smaller number of additional parts, which enables the apparatus to be manufactured at a reduced cost.

We claim:

1. An apparatus for holding workpieces in a stack and feeding the same, including a workpiece feed means for holding a plurality of workpieces in a stack and sequentially feeding the same, and a workpiece transporting means having a workpiece gripping hand for gripping an uppermost workpiece among the workpieces held in a stack on the workpiece feed means, the workpiece transporting means removing a workpiece gripped by the workpiece gripping hand from said workpiece feed means and transferring said gripped workpiece to a desired position, characterized in that said workpiece feed means comprises a pallet, a plurality of upright workpiece support rods arranged at intervals in a circle on said pallet, to thereby stably support in place said plurality of workpieces stacked on a workpiece support surface of said pallet, means for depressing said plurality of workpiece support rods to a position below said workpiece support surface of said pallet, and a means for constantly and resiliently lifting said plurality of workpiece support rods upward to extended upward from said workpiece support surface of said pallet, said workpiece gripping hand of said workpiece transporting means having a plurality of gripping fingers for releasably gripping a workpiece, and a depressing means disposed on a back side of said gripping fingers for simultaneously depressing said plurality of workpiece support rods of said workpiece feed means whereby said gripping fingers are brought to a position suitable for gripping said uppermost workpiece as said workpiece gripping hand is moved downward toward said uppermost workpiece.

2. An apparatus for holding a plurality of workpieces in a stack and feeding the same according to claim 1, wherein said workpieces have a cylindrical shape and the workpiece gripping hand is provided with at least three workpiece gripping fingers arranged at equal angular intervals in a circle.

3. An apparatus for holding a plurality of workpieces in a stack and feeding the same according to claim 2, wherein said depressing means of said workpiece gripping hand comprises a single annular plate having an outside diameter thereof greater than the diameter of said circle in which said workpiece support rods are arranged, and an inside diameter smaller than the diameter of said circle in which said workpiece support rods are arranged.

4. An apparatus for holding a plurality of workpieces in a stack and feeding the same according to claim 2, wherein said pallet is provided with a means for adjusting the diameter of said circle in which said workpiece support rods are arranged, depending on a diameter of each of said plurality of workpieces.

5. An apparatus for holding a plurality of workpieces in a stack and feeding the same according to claim 4, wherein said pallet comprises:

a round and deep vessel-like-member having a bottom wall thereof provided with a plurality of circularly articulate slots for guiding said means for disposing said plurality of workpiece support rods for radial movement with respect to a given center; and an adjusting plate rotatably held on an upper surface of said vessel-like-member and having a workpiece support surface thereof provided with a plurality of radial slots arranged at equal angular intervals for receiving said workpiece support rods therethrough.

6. An apparatus for holding a plurality of workpieces in a stack and feeding the same according to claim 1, wherein said disposing means of said plurality of workpiece support rods comprises a plurality of flanged, cylindrical bushings held on said pallet of said workpiece feed means each having a projecting portion projecting downward from the pallet, and wherein said resilient lifting means is a coil spring means provided between an outer surface of said cylindrical bushing and a lower end of each of said workpiece support rods.

7. An apparatus for holding a plurality of workpieces in a stack and feeding the same according to claim 6, wherein each of said workpiece support rods is guided by said cylindrical bushing for longitudinal movement between an uppermost position in which said workpiece support rod is lifted by a lifting force of said coil spring means and a lower position to which said workpiece support rod is moved against a resilience of said coil spring means to expose said uppermost workpiece of said plurality of stacked workpieces.

8. An apparatus for holding a plurality of workpieces in a stack and feeding the same according to claim 6, wherein each of said plurality of workpiece support rods is further provided with a support rod adjusting means for adjusting the uppermost position of the workpiece support rods above the upper surface of said pallet.

9. An apparatus for holding a plurality of workpieces in a stack and feeding the same according to claim 1, wherein said workpiece gripping hand comprises an end effector of an industrial robot.

10. An apparatus for holding a plurality of workpieces in a stack and feeding the same according to claim 9, wherein said workpiece transporting means comprises a robot arm of the industrial robot.

* * * * *